US005805071A

United States Patent [19]

Hur

[11] Patent Number: 5,805,071

[45] **Date of Patent: *Sep. 8, 1998**

[54] UNIVERSAL MOUNTING PLATE FOR AUDIBLE-VISUAL ALARMS

[75] Inventor: Inhong Hur, Oakhurst, N.J.

[73] Assignee: Wheelock, Inc., Long Branch, N.J.

[ * ] Notice: The term of this patent shall not extend beyond the expiration date of Pat. No. 5,684,467.

[21] Appl. No.: 876,615

[22] Filed: Jun. 16, 1997

Related U.S. Application Data

[62] Division of Ser. No. 524,865, Sep. 7, 1995, Pat. No. 5,684,467.

[51] Int. Cl.[6] .......... H02B 1/48

[52] U.S. Cl. .......... 340/693; 362/147; 362/368; 439/535; 439/536

[58] Field of Search .......... 340/693; 362/147, 362/368; 439/535, 536

[56] References Cited

U.S. PATENT DOCUMENTS

| | | | |
|---|---|---|---|
| 3,475,744 | 10/1969 | Frankfurt . | |
| 3,787,014 | 1/1974 | Story et al. . | |
| 4,164,076 | 8/1979 | Carrigan . | |
| 4,763,112 | 8/1988 | Hsieh . | |
| 4,841,288 | 6/1989 | Addicks . | |
| 5,096,405 | 3/1992 | Pace et al. . | |
| 5,135,411 | 8/1992 | Wiley et al. . | |
| 5,153,567 | 10/1992 | Chimento . | |
| 5,272,605 | 12/1993 | Johnstone . | |
| 5,280,273 | 1/1994 | Goldstein . | |
| 5,434,561 | 7/1995 | Greening et al. . | |
| 5,594,208 | 1/1997 | Cancellieri et al. | 439/535 |
| 5,684,467 | 11/1997 | Hur | 340/693 |

OTHER PUBLICATIONS

Simplex Brochure, Multi–Application Peripherals and Accessories, pp. 1–4, Jul. 1994.

Installation Instructions–Owner's Information, Gentex Corporation GXS Series "Remote Visual Signaling Appliance" (UL 1971 compliant)

Wheelock Drawing No. P80178–001, Dated Sep. 11, 1985 "Adaptor Bracket".

*Primary Examiner*—Glen Swann
*Attorney, Agent, or Firm*—Baker & Botts, L.L.P.

[57] ABSTRACT

A generally square mounting plate for attaching the cover of an audible-visual alarm to a backbox includes a plurality of openings along each side of the plate. The openings are configured and positioned to accommodate the mounting bolt placement of various standard backboxes, including 4-inch, international, single-gang and double-gang backboxes. Indicia are provided on the front of the plate to guide the installer in the correct assembly of the plate to the backbox to provide a desired orientation of a feature of the alarm, advantageously a strobe unit. The alarm generating components, e.g., a strobe unit and/or an acoustic transducer, may be carried either by the alarm cover or by the mounting plate.

53 Claims, 8 Drawing Sheets

UNIVERSAL MOUNTING PLATE FOR AUDIBLE-VISUAL ALARMS

This is a divisional of application Ser. No. 08/524,865 filed on Sep. 7, 1995 now U.S. Pat. No. 5,684,467.

BACKGROUND OF THE INVENTION

The present invention relates in general to the field of audible-visual alarms and, more specifically, to a universal mounting plate for mounting such alarms in multiple mounting configurations.

Audible-visual alarms are widely used in fire alarm and other emergency warning systems, telephone ringing systems for the visual or hearing impaired, and the like. As used herein, the term "audible-visual alarm" refers to an alarm which generates an audible alarm (e.g. a horn, bell, siren, etc), a visual alarm (e.g. a strobe or flash), or both. Typically, such alarms are attached to an electrical backbox, which in turn is mounted on the wall surface (surface mounted or wire mold mounted) or embedded in the wall. Electrical leads extend into the box through knock-outs in the rear or sides of the box. The audible and/or visual alarm generating elements, e.g., an acoustic transducer and/or an electronic strobe, are usually mounted on the alarm cover, with electric leads leading rearwardly into the backbox. An intermediate mounting or adapter plate is sometimes used to attach the alarm cover to the backbox.

Over the years, various types of alarm backboxes have come into general usage, including the single-gang box, the double-gang box, the four-inch box and the international (100 mm) box. Each of these backboxes has a different arrangement and spacing of threaded holes for receipt of the mounting bolts by which the alarm is attached to the backbox. Also, certain installations require different orientations of the alarm, e.g., with the strobe lamp horizontal or, in another orientation, vertical, or differently colored alarm covers, e.g., red or white. Heretofore, these mounting requirements have necessitated that alarm manufacturers maintain an inventory of different alarms and/or mounting plates to match the different backboxes and alarm orientations and colors. Not only does this result in increased inventory, but it also leads to complication and error in the shipment and installation of alarms. For example, Underwriter Laboratory (UL) specifications for strobe alarms require minimum light output levels in certain directions, e.g. vertically downward, and strobe reflectors are designed to direct the light output so as to meet these requirements. If the strobe is installed incorrectly, e.g. upside down, the light output will be misdirected and the UL requirements will not be met.

Although efforts have been made in the prior art to provide an alarm or alarm mounting plate which is useful with more than one type of backbox, no alarm or mounting plate has been provided which will accept most or all standard backboxes while simultaneously providing for error-free installation in multiple alarm orientations.

To further simplify alarm inventories and installation, it is desirable also to provide such a universal mounting plate which, additionally or alternatively to the aforementioned universal mounting feature, itself carries the audible and/or visual alarm generating elements, whereby only an easily changeable alarm cover need be provided to meet the requirements for differently colored or decorative alarms. Existing alarms designs have failed adequately to address this need of the prior art.

SUMMARY OF THE INVENTION

The foregoing and other requirements of the prior art are met, in accordance with the invention, by the provision of a generally square mounting plate which includes a plurality of openings along each side that are configured and positioned to accommodate the mounting bolt placement of different standard backbox types, including, in preferred embodiments, the 4-inch, international, single-gang and double-gang backboxes (surface or wire mold mounted). Other embodiments may be specific to fewer backbox types, such as only the 4-inch and international backboxes. The mounting plate additionally includes an enlarged opening, located generally centrally of the mounting plate, for receipt therethrough of at least a portion of the audible and/or visual alarm generating components. The alarm generating components may be mounted either on the alarm cover, which attaches to the mounting plate, or on the mounting plate itself. In the latter case, the alarm cover may constitute merely a decorative or color-coded cover that snap fits or is otherwise readily attached to the mounting plate.

In accordance with the invention, indicia are provided on the front of the plate to guide the installer in the correct assembly of the plate to the backbox so as to provide a desired orientation of a feature of the alarm, e.g. the strobe lamp. Such indicia preferably include an arrow and/or words to indicate unequivocally which side of the mounting plate should be installed at a specified location on the backbox, e.g., at the top. In embodiments in which the alarm feature to be oriented, e.g., the strobe lamp, is carried by the alarm cover, the indicia are arranged relative to at least one mounting element, e.g., a tab, on the plate and the alarm feature is arranged relative to a cooperating mounting element, e.g., a recess, on the alarm cover to ensure that the correct orientation of the cover, and thus of the alarm feature in question, necessarily results when the plate is secured to the backbox in accordance with the indicia.

By virtue of the foregoing features, the present invention provides a universal mounting plate which accommodates all standard backboxes and which facilitates simple and error-free assembly of the alarm to such backboxes in a desired orientation. In a particularly advantageous embodiment, the invention provides either a horizontal or a vertical orientation of the strobe lamp of an audible-visual alarm.

BRIEF DESCRIPTION OF THE DRAWINGS

For a better understanding of the invention, reference may be had to the following description of preferred embodiments thereof, taken in conjunction with the accompanying drawings, in which.

DESCRIPTION OF THE PREFERRED EMBODIMENT

Figure 1:
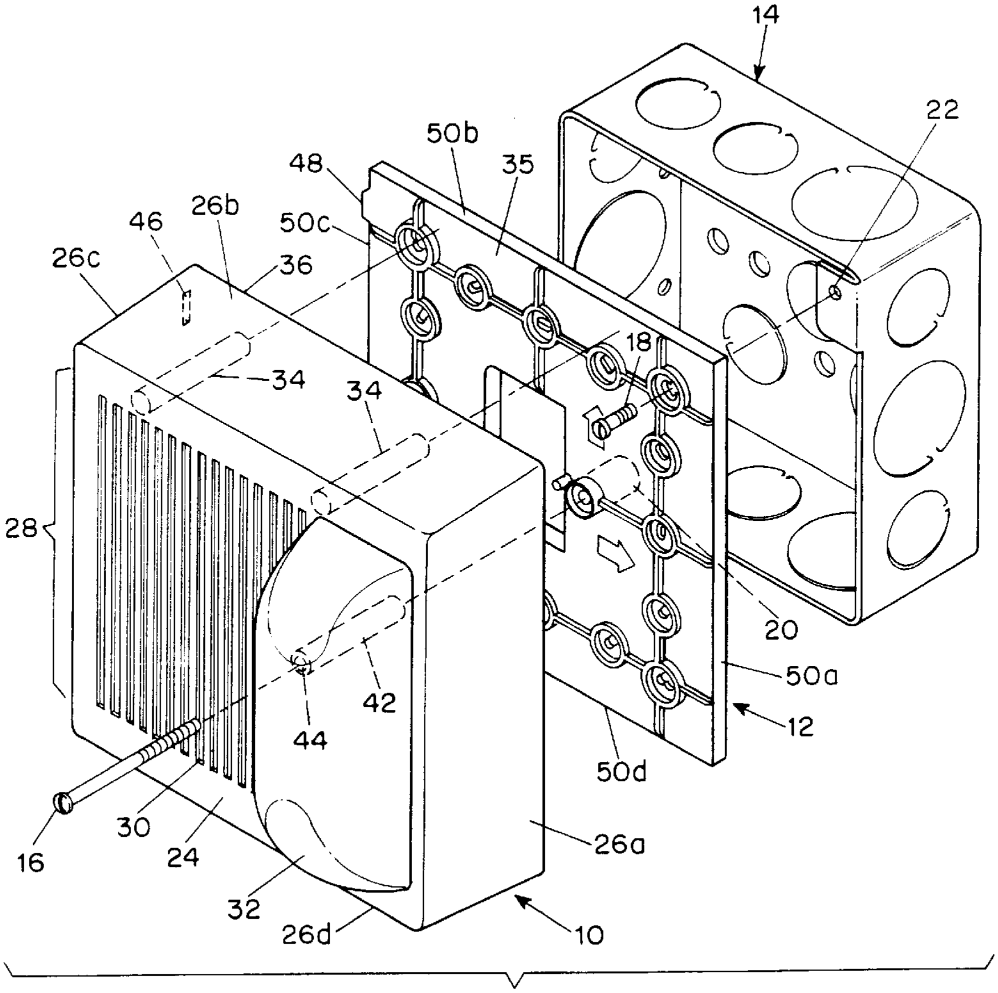
FIG. 1 is an expanded perspective view of one embodiment of an alarm cover, mounting plate and backbox assembly in accordance with the invention.

In the illustrative embodiment of the invention shown in FIG. 1, an audible-visual alarm assembly includes an alarm cover 10, a mounting plate 12 and a backbox 14. As described more fully hereinafter, the cover 10 is secured to the mounting plate 12 by a single fastener 16, and the mounting plate 12 is in turn secured to the backbox 14 by one or more fasteners 18. For simplicity and ease of installation, the fasteners 16 and 18 are preferably bolts, which are received by a threaded receptacle 20 in the mounting plate 12 and the conventional threaded openings 22 (only one of which is shown) in the backbox 14, respectively. Alternatively, other fasteners, such as self-tapping screws, may be used.

It is a feature of the invention that the mounting plate 12 enables the alarm cover 10 to be attached to all standard backboxes, including the single-gang box, the double-gang box (either surface mounted or wire mold mounted), the 4-inch box and the international (100 mm) box. By way of illustration, FIG. 1 depicts a 4-inch backbox (4 inches square). The manner of attachment of the plate 12 to the other types of backboxes is described hereinafter.

When attached to a wall, the alarm assembly may be surface mounted, in which case the backbox 14 is attached directly to the wall surface, flush mounted, in which case the backbox 14 is recessed within the wall and the back edge of the cover 10 abuts the wall surface, or semi-flush mounted, in which case the backbox is recessed as before but an extender is inserted between the backbox and the back edge of the cover 10 to offset it from the wall surface by a desired distance. If an extender were employed with the assembly of FIG. 1, it would be located between the mounting plate 12 and the backbox 14 and secured thereto by the fasteners 18. Alternatively, the box may be wire mold mounted.

As shown in FIG. 1, the audible-visual alarm cover 10 is preferably square in outline, having a front wall 24 and four perimeter side walls 26*a*, 26*b*, 26*c* and 26*d*. The side wall length is somewhat larger than the largest backbox to be fitted, in this case the 4-inch backbox. The front-to-back depth of each sidewall is sufficient to accommodate receipt of the audible and visual alarm generating units (not shown), which are conventional, within the cover 10. In a typical audible-visual alarm, the audible alarm unit includes a piezoelectric transducer and associated electronics and the visual alarm unit includes a strobe lamp and associated electronics. The strobe lamp typically would include a flash tube and a reflector.

The region 28 of the front wall 24 overlying the audible alarm generating element is formed as a grille which transmits sound, while preferably presenting a solid appearance when viewed frontally. To that end, the grille is preferably comprised of a plurality of parallel, elongated recesses 30 in the front wall 24, with at least one longitudinal side wall of each recess being apertured in a direction parallel to the front wall 24 for sound transmission purposes.

A transparent or translucent strobe lens 32 is mounted on the front wall 24, overlying a front-to-back opening (not shown) in the wall 24 for receipt of the strobe lamp and associated components of the alarm. For ease of assembly, the strobe lens 32 preferably snap-fits within the opening. In the alarm orientation depicted in FIG. 1, the strobe lamp and lens 32 are oriented in the vertical direction. They may alternatively be oriented in the horizontal direction. As described hereinafter, cooperating structure on the cover 10 and the mounting plate 12 accommodates and facilitates either orientation.

As shown generally in FIG. 1 and in more detail in FIGS. 2–5, the mounting plate 12 is substantially square in outline, and preferably is slightly smaller in size than the open back side of the cover 10 so as to fit snugly therewithin and substantially close the back side thereof. A plurality, e.g. four, supporting posts 34 extend rearwardly from the inside of the front wall 24 of the cover and terminate short of the back edge 36 of the side walls 26*a*–26*d* by approximately the thickness of the mounting plate 12. The posts 34, only two of which are shown (the other two would be located at the bottom of the cover 10 in FIG. 1 directly below the two shown), abut the front surface 35 of the plate 12 and position it so that the rearmost perimeter edge 40 of the plate 12 (FIGS. 3 and 4) is substantially even with the back edge 36 of the cover 10.

A front-to-back extending tubular member 42 is also provided on the front wall 24 of the cover 10. The member 42 is located so as to be in alignment with the receptacle 20 on the mounting plate 12 when the plate 12 is inserted in the back side of the cover 10. An opening 44 in the front wall of the cover 10 connects with the hollow interior of the tubular member 42 for passage therethrough of the fastener 16. The opening 44 and associated tubular member 42 advantageously constitute the only opening through the cover 10 for fastening the cover to the mounting plate 12. If desired, however, additional tubular members and openings may be provided to cooperate with corresponding additional receptacles on the plate 12.

The opening 44 and tubular member 42 are preferably located adjacent to the interior side of the strobe lens 32 at substantially the vertical midpoint (as viewed in FIG. 1) of the cover 10. The sidewall 26*c* of the cover 10 located opposite to the sidewall 26*a* adjacent the strobe lens 32 is formed with at least one mounting element, e.g., a recess 46, and preferably two or more such elements in the inner surface thereof. Each element or recess 46 is located adjacent the rear edge 36 of the cover, and receives a cooperating element, e.g., a tab 48, on the corresponding side 50*c* of the mounting plate 12. The mounting elements 46 and 48 may take forms other than recesses and tabs, but preferably are designed to permit rapid assembly of the cover 10 and the plate 12.

Figure 2:
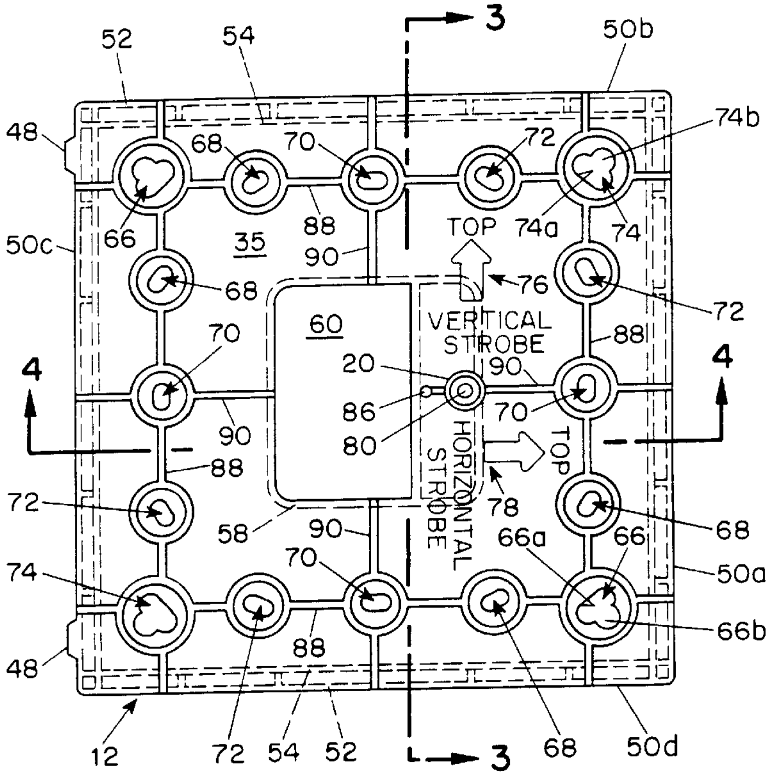
FIG. 2 is a front view of the mounting plate of FIG. 1.

If only a single recess 46 and tab 48 are provided, they are preferably located centrally of the cover 10 and plate 12 on a line with the fastener opening 44 and the receptacle 20. If two (or more) cooperating recesses 46 and tabs 48 are provided (as illustrated in FIGS. 1 and 2), the recesses 46 and tabs 48 are preferably spaced apart symmetrically along the length of the side wall 26*c* and plate side 50*c*, respectively, relative to the fastener opening 44 and the receptacle 20. The receptacle 20 is preferably located on the bisector of the opposite plate side 50*c*. When the tab or tabs 48 of the mounting plate 12 are inserted into the cooperating recess or recesses 46 of the cover 10, the mounting plate 12 fits within the back of the cover 10 with the receptacle 20 in alignment with the tubular member 42 and the opening 44 for receipt of the fastener 16. Hence the cover 10 may readily be attached to the mounting plate 12 by means only of the tabs 48 and recesses 46 and the single fastener 16. This greatly facilitates easy and error-free assembly of the alarm cover 10 on the plate 12.

Because the alarm cover 10 carries the alarm generating components in the embodiment of FIGS. 1–5, it is preferable for security purposes that the cover 10 be bolted to the mounting plate 12. If desired, however, the cover 10 could be attached to the plate 12 in other ways, e.g., by a snap fit. Any suitable structure, such as that shown in the embodiment of FIGS. 6–10, could be provided for that purpose.

The preferred embodiment of the mounting plate 12 is partially shown in FIG. 1 in juxtaposition to the alarm cover 10, on the one hand, and the backbox 14, on the other hand. The plate is shown in more detail in FIGS. 2–5. Like the cover 10, the mounting plate is preferably square in outline, having equal length sides 50*a*, 50*b*, 50*c* and 50*d*. Both the alarm cover 10 and the mounting plate 12 are preferably injection molded from a high-impact resistant and flame retardant plastic, such as acrylonitrile, butadiene styrene, or the like.

The plate 12 may be formed with double, rearwardly extending perimeter walls 52 and 54 for reinforcement and to provide a tight fit with the wall surface around the periphery of the backbox 14. To that end, the inner wall 54 is preferably slightly longer than the outer wall 52 (see FIGS. 3 and 4). Cross reinforcement ribs 56 may be formed between the walls 52 and 54 for added strength. The back of the plate 12 is otherwise flat, except for a rearwardly extending flange 58, which partly surrounds a central front-to-back opening 60 in the plate, and the rearwardly extending receptacle 20. The opening 60 is bounded on the side adjacent to the receptacle 20 by a rearwardly extending cross piece 62 of the same depth as the flange 58. Triangularly shaped members 64 may be formed integrally with the plate proper and the receptacle 20 to reinforce the receptacle. For a like purpose, the flange 58 preferably extends around and merges into the receptacle 20, as best shown in FIGS. 4 and 5. The opening 60 is sized and positioned to permit an electrical connection to be established from all standard backboxes 14 through the plate 12 to the alarm generating units within the cover 10. Preferably, the opening is sufficiently large to accept passage therethrough of the terminal block for the alarm generating units.

Viewed from the front (FIG. 2), the plate 12 is seen to have a plurality of front-to-back openings 66, 68, 70, 72 and 74 along each side of the plate 12. In accordance with the invention, the openings 66–74 are positioned and arranged to accommodate the mounting bolt placements for all standard backboxes, including the single-gang box, dual-gang box, the 4-inch box and the international (100 mm) box. Thus the endmost openings 66 and 74 are sized and positioned to receive therethrough mounting bolts or screws 18 for the 4-inch backbox and the 100 mm backbox. To that end, each end opening 64 and 74 preferably has an oval-shaped base opening 66*a*, 74*a* that is inclined at approximately 45% to the adjacent plate sides, e.g., 50*a*, 50*b*, and a generally circular opening 66*b* and 74*b* that joins the base opening 66*a* and 74*a*, respectively, and extends outwardly from the center of the plate along a diagonal of the plate. This configuration of the end openings 66, 74 provides sufficient space and maneuverability to accommodate the mounting bolt placement on both the 4-inch backbox and the international (100 mm) backbox. The inclination of the oval-shaped base opening 66*a*, 74*a* also permits the mounting plate 12 to be rotated somewhat to allow the cover 10 to be mounted plumb even though the backbox is slightly askew.

The intermediate openings 68, 72 located adjacent to the end openings 66, 74 are substantially identical oval-shaped openings that are positioned for mounting the plate 12 to a standard double-gang backbox. The openings 68, 72 are also preferably inclined relative to the adjacent plate side 50*a*–50*d*, but at approximately one-half the inclination of the base openings 66*a*, 74*a* of the end openings 66, 74, i.e., at approximately 22½° to the adjacent plate side. Also, the two openings 68, 72 along each plate side are preferably inclined in opposite directions, so that each is inclined towards the center of the adjacent side. The combination of the oval-shape and the inclination of each opening 68, 72 permits the mounting plate 12 to be angled somewhat relative to the double-gang backbox, should this be necessary in order to mount the cover 10 in a plumb condition on the wall.

Finally, the center openings 70 are preferably oval-shaped and parallel to the adjacent plate sides 50*a*–50*d*. The openings 70 are positioned at the midpoints of the plate sides and are adapted to mount the plate 12 to a single-gang backbox. The oval shape of the openings 70 accommodates some relative displacement between the plate and the backbox to accommodate out-of-plumb or otherwise misaligned backboxes.

As noted, it is a feature of the invention that the mounting plate 12 may be attached to a backbox 14 for either horizontal or vertical orientation of the strobe lens 32. For that purpose, the openings 66–74 are identically arranged along each side of the plate 12. No matter which side of the plate is up, therefore, the openings 66–74 will be correctly positioned relative to the backbox for attachment of the plate to the backbox using the standard bolt placements.

To facilitate correct assembly of the mounting plate 12 to the backbox for either vertical or horizontal strobe orientation, the front surface 38 of the plate 12 is preferably formed or marked with indicia which indicate to the installer how the plate is to be attached to the backbox to provide the desired strobe orientation. Such indicia are shown in FIG. 1 at 76 for the vertical strobe orientation and at 78 for the horizontal strobe orientation. As shown, the indicia preferably include one or, preferably, both arrows and words, which unequivocally indicate which side of the plate 12 should be uppermost, i.e., at the top, when the plate is attached to the backbox. With the plate oriented and attached to the backbox in this manner, the mounting tabs 48 will necessarily be correctly positioned to orient the alarm cover 10 (and strobe lens 32) correctly when the recesses 46 in the cover wall 26*c* are brought into engagement with the tabs 48. It will be understood, of course, that other forms of indicia may be provided, so long as the correct orientation of the plate is clearly indicated. Also, the indicia 76 could be used to indicate a desired orientation of a feature of the alarm other than the strobe.

Figure 3:
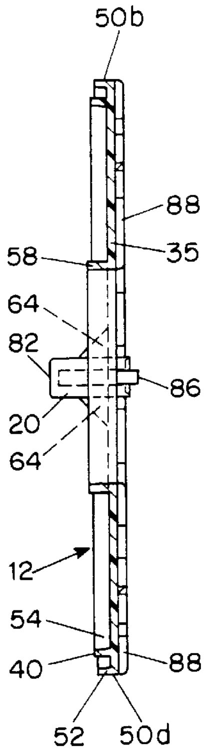
FIG. 3 is a sectional view taken along the line 3—3 of FIG. 2 and looking in the direction of the arrows.
Figure 4:
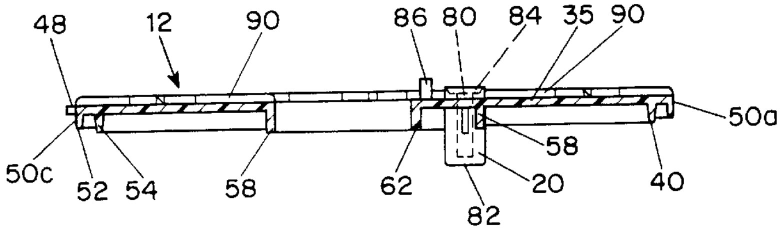
FIG. 4 is a sectional view taken along the line 4—4 of FIG. 2 and looking in the direction of the arrows.
Figure 5:
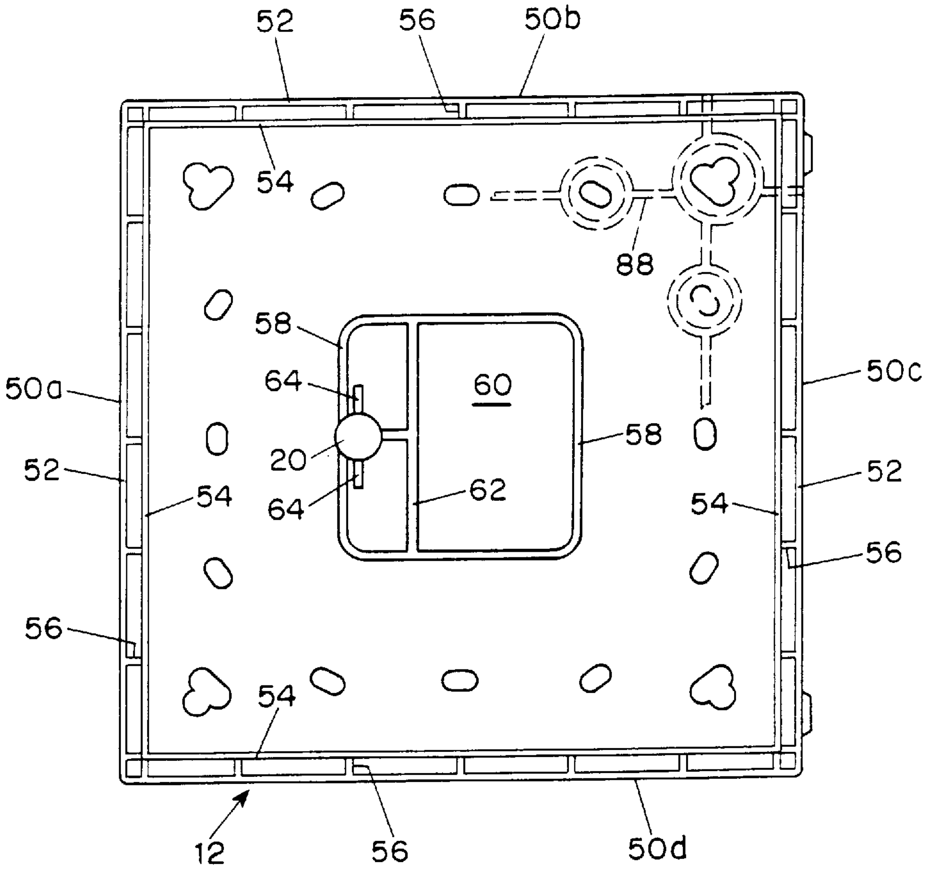
FIG. 5 is a back view of the mounting plate of FIG. 2.
Figure 6:
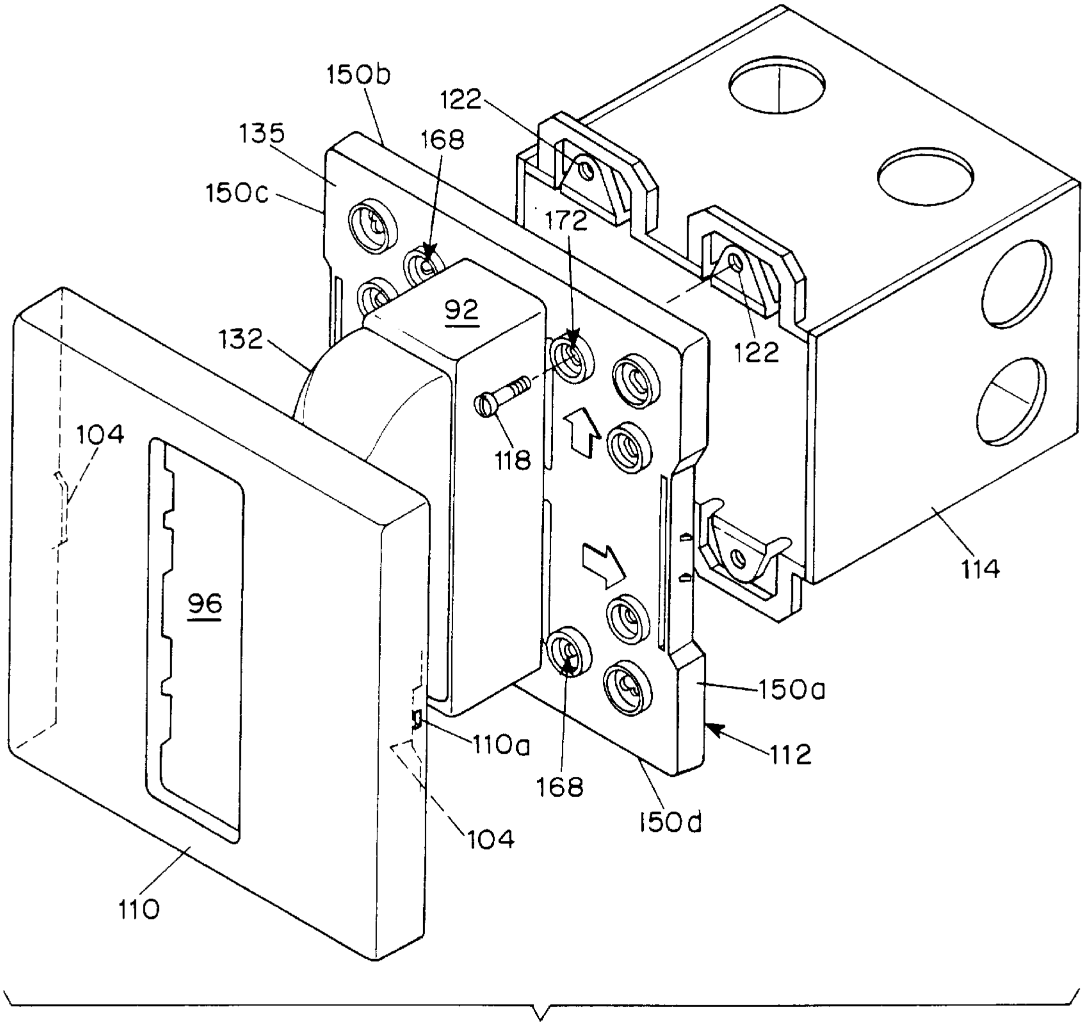
FIG. 6 is an expanded perspective view of another embodiment of an alarm cover, mounting plate and backbox assembly in accordance with the invention.
Figure 7:
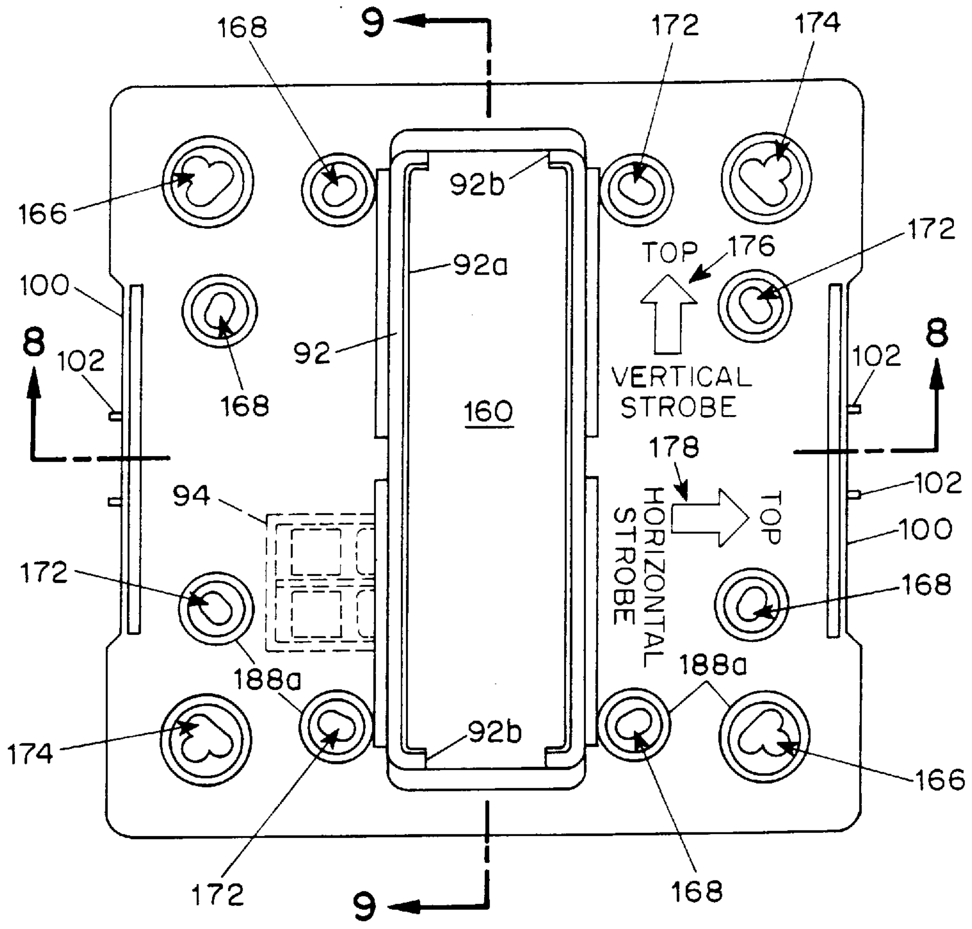
FIG. 7 is a front view of the mounting plate of FIG. 6.
Figure 8:
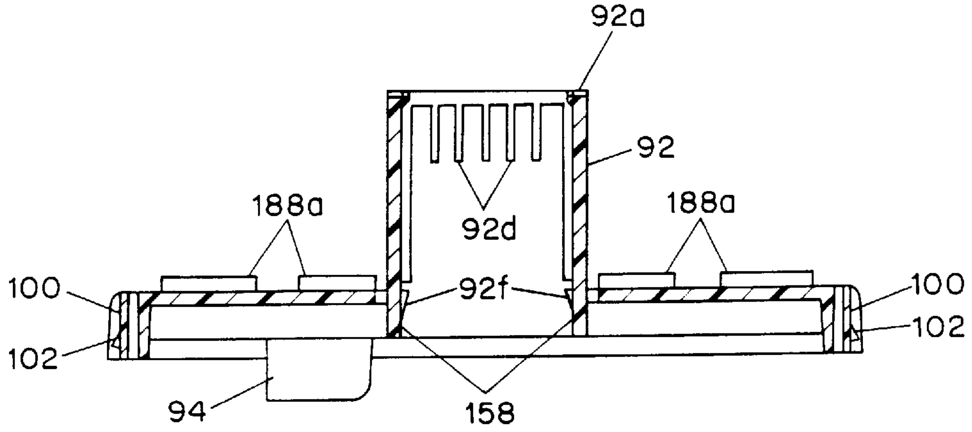
FIG. 8 is a sectional view taken along the line 8—8 of FIG. 7 and looking in the direction of the arrows.
Figure 9:
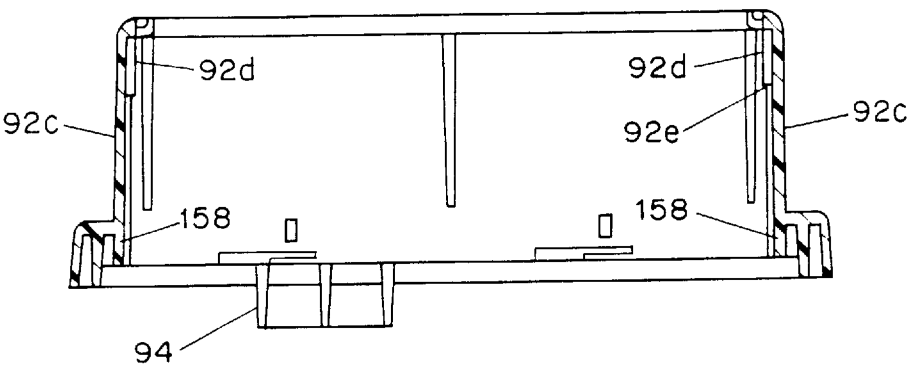
FIG. 9 is a sectional view taken along the line 9—9 of FIG. 7 and looking in the direction of the arrows.
Figure 10:
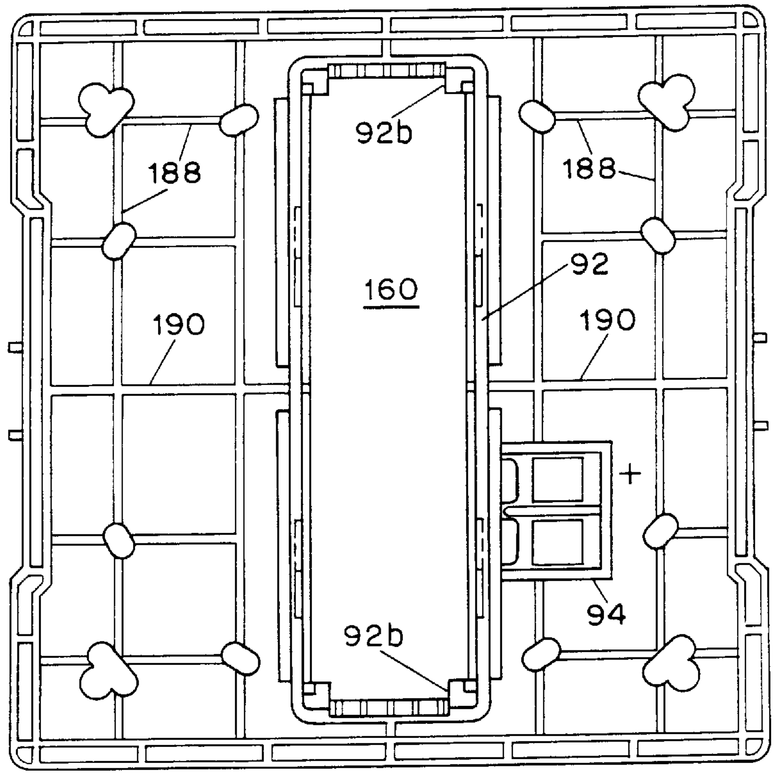
FIG. 10 is a back view of the mounting plate of FIG. 7.
Figure 11:
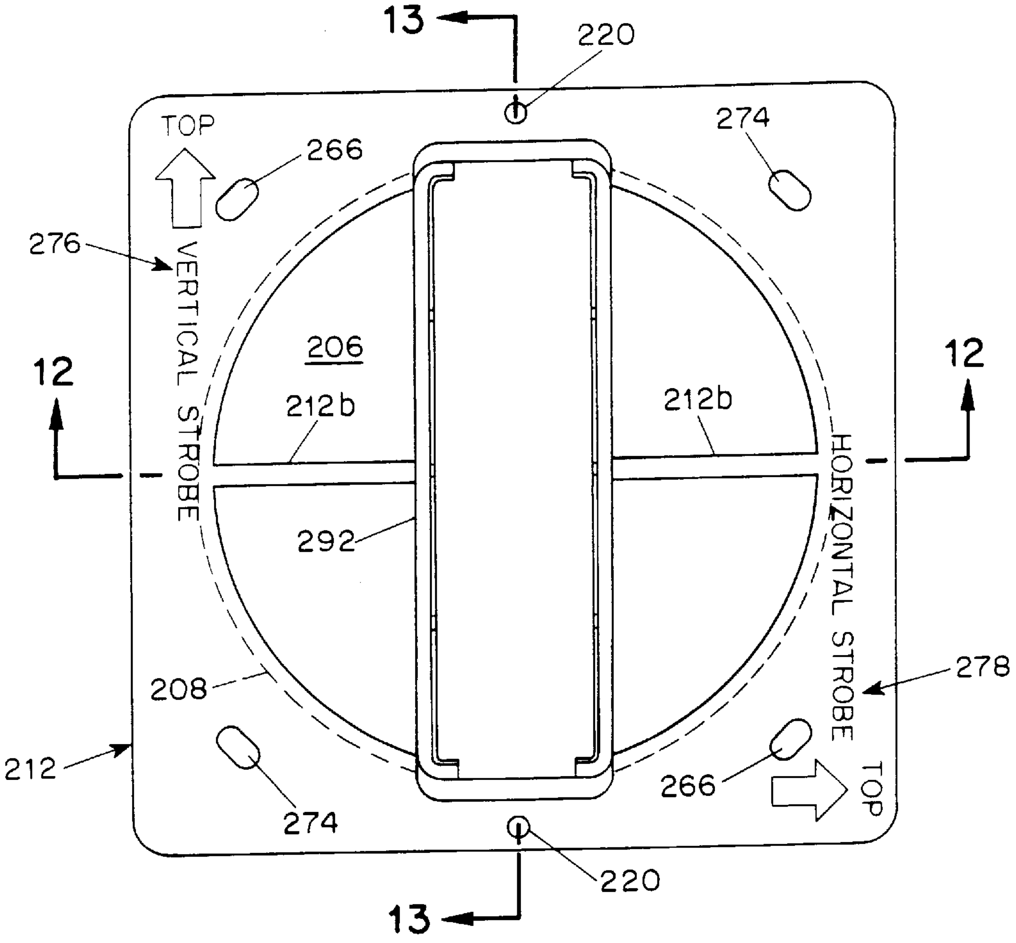
FIG. 11 is a front view of still another embodiment of a mounting plate in accordance with the invention.
Figure 12:
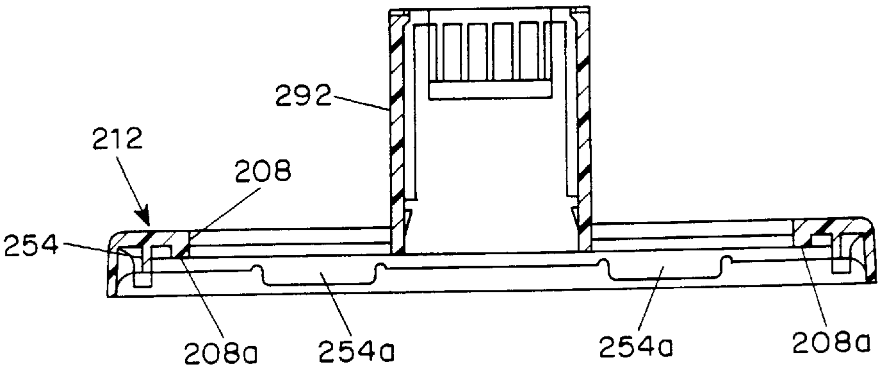
FIG. 12 is a sectional view taken along the line 12—12 of FIG. 11 and looking in the direction of the arrows.
Figure 13:
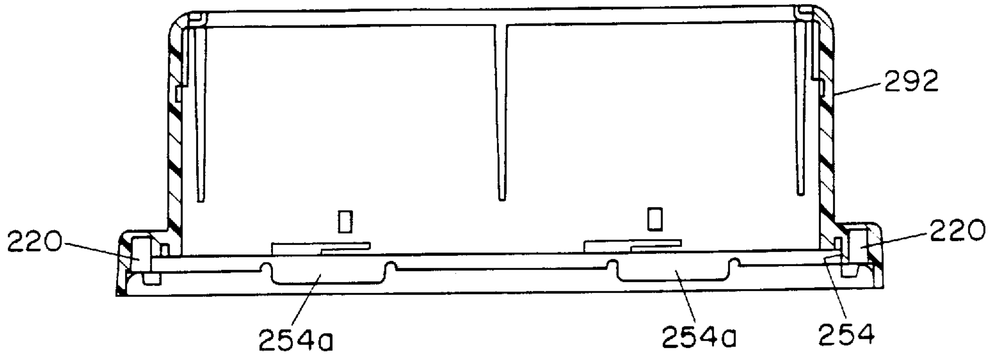
FIG. 13 is a sectional view taken along the line 13—13 of FIG. 11 and looking in the direction of the arrows.
Figure 14:
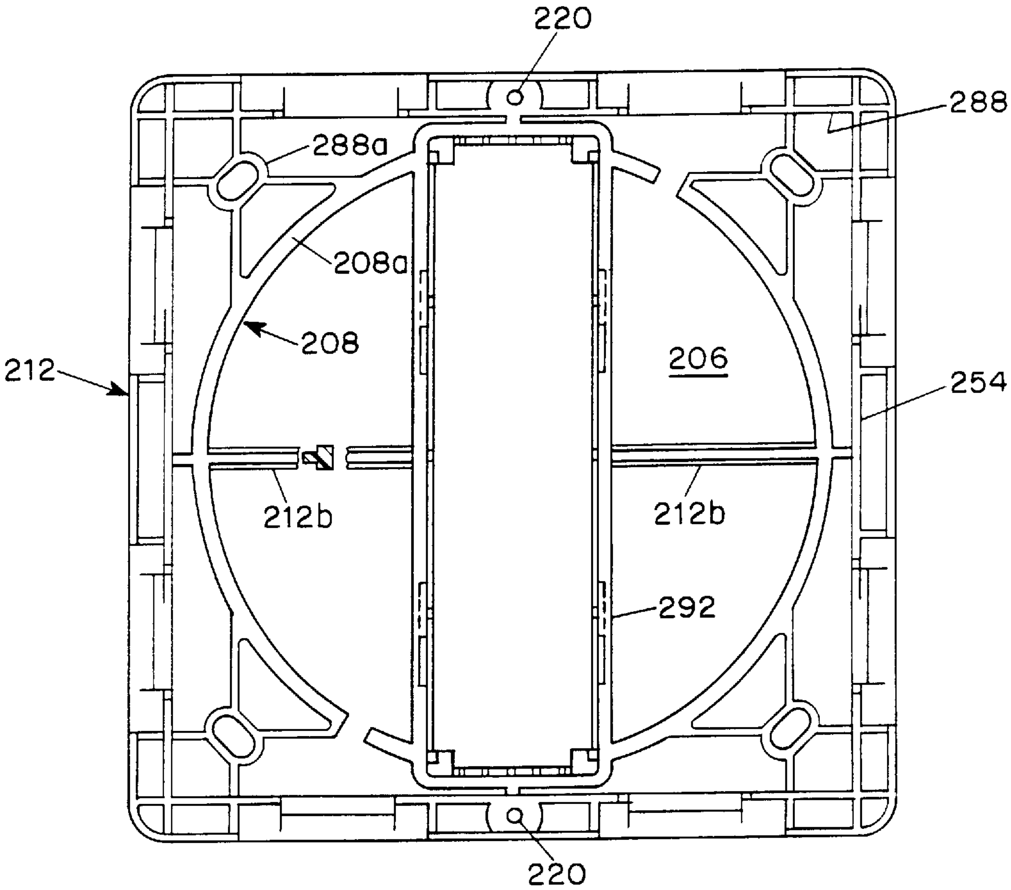
FIG. 14 is a back view of the mounting plate of FIG. 11.

As shown in FIGS. 2–4, the receptacle 20 for the mounting fastening 16 opens, as at 80, through the front surface 35 of the plate 12 and preferably is closed at the back end 82. To facilitate alignment of the tubular member 42 on the cover 10 with the receptacle 20, the opening 80 is preferably surrounded by a inwardly beveled lip 84 (FIG. 4), which serves to center the back end of the member 42 on the opening 80.

An upright pin 86 is preferably formed on the front of the plate 12 adjacent to the receptacle 20. Its purpose is to abut the back side of the PC board (not shown), which fits within the alarm cover 10 and carries the electronics for the alarm, to provide support for the board. Additional support pins may be provided if desired. Also, the pin or pins 86 may be located at positions different from that shown in the drawings.

If desired, structural reinforcement may be provided for the plate 12 by forming protruding ribs 88 which extend across the full length of each side 50*a*–50*d* and which encircle the openings 66–74. Ribs 90 may also be formed centrally of the plate 12 to provide additional reinforcement if desired. The ribs 88 and 90 may be omitted if structural reinforcement of the plate is not needed.

Another embodiment of the invention is depicted in FIGS. 6–10, wherein like parts are identified by the same reference numbers as in FIGS. 1–5 increased by one hundred. The alarm assembly includes an alarm cover 110, a mounting plate 112 and an electrical backbox 114. The backbox 114 is, in this instance, of the double-gang type, having correspondingly located threaded openings 122 for receipt of threaded fasteners 118.

The mounting plate 112 is similarly sized and shaped as the plate 12 of FIG. 1. It includes along each side 150*a*, 150*d*, 150*c* and 150*d* a plurality of openings for passage therethrough of the threaded fasteners 118. As more fully shown in FIGS. 7 and 9, the endmost openings 166, 174 along each plate side are preferably positioned and configured in the same manner as in the embodiment of FIGS. 1–5, i.e., so as to match up with the threaded openings of the 4-inch and international backboxes. The intermediate openings 168, 172 along each plate side are likewise preferably arranged as in FIGS. 1–5, i.e., to match up with the threaded openings of the double-gang backbox. Hence, in FIG. 7 the threaded openings 122 of the double-gang backbox 114 are shown aligned with the intermediate openings 168, 172 spaced along the sides 150*b*, 150*d* of the mounting plate 112. As in the earlier embodiment, the endmost openings 166, 174 and the intermediate openings 168, 172 preferably include oval-shaped, inclined portions to accommodate out-of-plumb backboxes.

Although no central openings corresponding to the central openings 70 of the plate 12 are provided in the plate 112, the plate 112 nonetheless can be mounted to a single-gang backbox by use of the intermediate openings 168 or 172. In such case, the plate 112 will be horizontally offset relative to the backbox 114, but it will still cover the relatively narrow single-gang backbox.

In FIGS. 1–5, the reinforcing ribs 88, 90 are located on the front side of the plate 12. If desired, these ribs could be formed on the back surface of the plate, and in the embodiment of FIGS. 6–10 they are shown on the back surface of the plate 112 at 188, 190. Preferably, a circular reinforcing rib 188*a* surrounds each opening 166, 168, 172, 174 on the front side of the plate 112. Such circular ribs may, however, also be provided on the back side of the plate or eliminated altogether if reinforcement is not needed.

Unlike the previous embodiment, where the alarm generating components and the strobe lens 32 are carried by the alarm cover 10, in the embodiment of FIGS. 6–10, which is a visual alarm only, the strobe lamp and electronics and the strobe lens 132 are carried by the mounting plate 112. To that end, an elongated upstanding base 92 is integrally formed on the plate 112 in surrounding relation to the enlarged front-to-back opening 160 in the plate. The opening 160 is surrounded on the back side of the plate 112 by an integral flange 158.

The open forward end 92*a* of the base 92 is formed at either longitudinal end with a recess 92*b* for receipt of a depending resilient tongue (not shown) on the corresponding end of the strobe lens 132 (not shown in FIGS. 7–10). The end walls 92*c* of the base 92 are formed with ribs 92*d* which extend rearwardly from the open forward end 92*a* and terminate in a shoulder 92*e* behind which detents on the ends of the tongues of the strobe lens 132 snap to attach the lens 132 to the plate 112.

The strobe lamp (which is conventional and not shown) is inserted into the base 92 through the open back side thereof and preferably is snap-fitted into place. For that purpose, detents 92*f* may be formed on the interior of the base 92*a* adjacent the back side thereof.

If desired, a mounting receptacle 94 may be formed on the back side of the plate 112 for the electronics associated with the strobe lamp. In this way, all of the components of the electronic strobe unit will be carried by the plate 112, requiring only electrical leads to connect to line power via the backbox 114 and an essentially decorative cover 110 to conceal the mountings openings 166, 168, 172, 174, fasteners 118 and other functional components of the plate 112. The cover 110 may take any convenient shape, e.g. square or circular, and may be of approximately the same size as the plate 112 (as shown in FIGS. 6–10) or it may be larger, as would be the case, for example, where a circular cover is used. The cover 110 is formed with an opening 96 shaped to fit over the base 92 of the plate 112, so that, when assembled, it fits snugly over the base and against the front surface of the plate 112.

Where the shape of the cover 110 permits, it preferably is configured to snap-fit onto the plate 112. In the embodiment of FIGS. 6–10, for example, the sides 150*a*, 150*c* of the plate 112 that parallel the length of the base 92 may be formed with a flexible strip 100 and cam-forming members 102 which cooperate with detents 104 on the corresponding inner walls of the cover 110. As the cover 110 is pushed onto the plate, the detents 104 on the cover walls engage the cam members 102, which are beveled rearwardly, and cam the strips 100 inwardly. The strips 100 and cam members 102 then snap back behind the detents 104 to capture the cover 110 on the plate 112. Slots 110*a* may be provided in the walls of the cover 110 for access by a screw driver or other tool when it is desired to remove the cover. Alternatively, the cover 110 may be bolted or otherwise secured to the plate 112.

Because strobe lamps are often directional in their light output, it is important that the lamp not be installed upside down. Hence, as in the prior embodiment, indicia 176, 178 in the form of arrows and/or words are provided on the front surface of the plate 110 to guide the installer in the correct attachment of the plate to the backbox.

Mounting the alarm-generating components on the mounting plate, rather than on the cover, affords further economies in manufacture, inventory and installation relative to prior alarms and relative to the embodiment of FIGS. 1–5. The same basic mounting plate structure can be employed for all alarms of a given type, and the alarm can then be customized to a particular application merely by changing the relatively inexpensive cover 110.

In the embodiment of the mounting plate of FIGS. 11–14, wherein like parts are identified by the same reference numbers as in FIGS. 1–10 increased by two hundred, the mounting plate 212 is configured to carry both the visual and the acoustic alarm generating components. Thus, as in FIGS. 6–10, the plate 212 is formed with an upstanding base 292 for a strobe lamp, and also is formed with a central aperture 206 surrounded by a circular flange 208 behind which a speaker (not shown) is to be mounted. The periphery of the speaker abuts against the rear surface 208*a* of the flange 208, and preferably is held in place by ultrasonic welding of tabs 254*a* formed on the rear of the inner peripheral wall 254 of the plate 212. The strobe base 292 spans the aperture 206 and is reinforced at the midpoint by transversely extending ribs 212*b*.

As in the earlier embodiments, indicia 276, 278 are provided on the front surface of the plate 212 to indicate the correct orientation of the plate when it is attached to the backbox.

As in the embodiment of FIGS. 6–10, an alarm cover (not shown) fits over the strobe base 292 and is attached to the plate 212, as, for example, by threaded fasteners (not shown) received by openings 220 formed in or through the plate. The cover may be approximately the same size as the plate or larger, and it may be square, circular or any other desired shape. To facilitate sound transmission, the area of the cover overlying the aperture 206 is preferably perforated or slotted.

As the mounting plate 212 is intended to carry a speaker unit, it generally will require a 4-inch or international backbox to accept the rearwardly projecting parts of the speaker unit. The plate is shown, therefore, with only the two endmost openings 266, 274 along each side of the plate. As before, the openings 266, 274 are preferably oval-shaped and inclined to accommodate out-of-plumb backboxes.

In this embodiment, the transverse reinforcing ribs 288 and the ribs 288*a* surrounding the openings 266, 274, are formed entirely on the back side of the plate 212. The ribs 288 and the midpoint ribs 212*a* are preferably integrally formed with the flange 208 surrounding the aperture 206.

Although the invention has been described and illustrated herein by reference to a specific embodiment thereof, it will be understood that such embodiment is susceptible of modification and variation without departing from the inventive concepts disclosed. All such modifications and variations, therefore, are intended to be included within the spirit and scope of the appended claims.

I claim:

1. A mounting plate for mounting an audible-visual alarm to a backbox, comprising:

a generally square plate having a front side and a back side;

a plurality of front-to-back openings in the plate located along each side of the plate for the receipt therethrough in the front-to-back direction of mounting fasteners;

an enlarged front-to-back opening in the plate located generally centrally of the plate for facilitating electrical connection to the alarm generating components of the alarm; and indicia on the front side of the plate for indicating the correct orientation of the plate, as attached to a backbox, to provide a desired orientation of a feature of the alarm.

2. The mounting plate of claim 1, wherein the indicia indicate the correct orientation of the plate for each of a horizontal orientation of a feature of the alarm and a vertical orientation of the feature of the alarm.

3. The mounting plate of claim 2, wherein said feature of the alarm is a strobe lamp.

4. The mounting plate of claim 3, wherein the indicia comprise at least one of an arrow and words indicating the correct location of a particular side of the mounting plate to provide the desired orientation of the strobe lamp.

5. The mounting plate of claim 3, wherein:

the strobe lamp is carried by an alarm cover to be attached to the plate;

at least one mounting element is located on one side of the plate for engagement with at least one cooperating element on the alarm cover;

said at least one mounting element and said at least one cooperating element being positioned relative to said indicia and to said strobe lamp, respectively, such that the alarm cover can only be attached to the plate with the strobe lamp in the correct orientation indicated by said indicia.

6. The mounting plate of claim 5, further comprising at least one opening formed in the plate at a location spaced from said one side of the plate for receipt of a fastener for securing the alarm cover to the plate.

7. The mounting plate of claim 6, wherein said at least one opening comprises the only opening in said plate for receipt of a fastener for securing the cover to the mounting plate.

8. The mounting plate of claim 5, further comprising a plurality of said mounting elements on said one side of the plate for engagement with a corresponding number of cooperating elements on the alarm cover.

9. The mounting plate of claim 8, wherein each mounting element on the plate comprises a projecting tab for insertion into a corresponding recess in the alarm cover.

10. The mounting plate of claim 1 wherein said plate is a one-piece, injection-molded plastic member.

11. The mounting plate of claim 1, wherein said plurality of openings are sized and located to permit the plate to be mounted to a plurality of different backboxes.

12. The mounting plate of claim 11, wherein said plurality of different backboxes include the single-gang backbox, the double-gang backbox, the four-inch backbox and the international backbox.

13. The mounting plate of claim 1, wherein said plurality of openings comprise five openings along each side of the plate, two of said openings being located adjacent the respective ends of each side and defining corner openings, one of said openings being located at substantially the midpoint of each side and defining a center opening, and one of said openings being located between each end opening and said center opening and defining an intermediate openings.

14. The mounting plate of claim 13, wherein:

said end openings along each plate side are sized and positioned to permit mounting of the plate to a four-inch backbox and to an international backbox;

said center opening along each plate side is sized and positioned to permit mounting of the plate to a single-gang backbox; and said intermediate openings along each plate side are sized and positioned to permit mounting of the plate to a double-gang backbox.

15. The mounting plate of claim 14, wherein each corner opening and each intermediate opening comprises at least in part an oval-shaped opening that is inclined at an angle to the adjacent side of the plate.

16. The mounting plate of claim 15, wherein the angle of inclination of the oval-shaped opening of each corner opening is substantially twice as great as the angle of inclination of the oval-shaped opening of each intermediate opening.

17. The mounting plate of claim 16, wherein:

the angle of inclination of the oval-shaped opening of each corner opening is substantially 45°; and the angle of inclination of the oval-shaped opening of each intermediate opening is substantially 22½°.

18. The mounting plate of claim 15, wherein each center opening comprises an oval-shaped opening that is substantially parallel to the adjacent side of the plate.

19. The mounting plate of claim 1, wherein:

said enlarged opening is surrounded on the front side of said plate by an upstanding base;

a strobe lamp is mounted in said upstanding base; and said indicia are arranged relative to said strobe lamp such that, when the plate is attached to a backbox in accordance with said indicia, the strobe lamp is oriented in the desired orientation.

20. The mounting plate of claim 19 wherein said plurality of openings along each plate side includes at least two openings, one located adjacent each end of the plate side.

21. The mounting plate of claim 20, wherein said plurality of openings along each plate side further includes two additional openings, one located intermediate to each end opening and the centerline of said plate side.

22. The mounting plate of claim 21, wherein:

said end openings along each plate side are sized and positioned to permit mounting of the plate to a four-inch backbox and to an international backbox; and said intermediate openings along each plate side are sized and positioned to permit mounting of the plate to a double-gang backbox.

23. The mounting plate of claim 19, further comprising means carried by said plate for attaching an alarm cover to the front of the plate.

24. The mounting plate of claim 19, further comprising:

means for mounting a speaker to the back side thereof; and an opening in said plate generally overlying said speaker for sound transmission through the plate.

25. The mounting plate of claim 19, further comprising means carried at least in part by the plate for establishing a releasable snap-fit connection between the plate and an alarm cover.

26. The mounting plate of claim 1, wherein the indicia comprise at least one of an arrow and words indicating the correct location of a particular side of the mounting plate to provide the desired orientation of the strobe lamp.

27. An audible-visual alarm and mounting plate assembly, comprising:

a generally square plate having a front side and a back side;

a plurality of front-to-back openings in the plate located along each side of the plate for the receipt therethrough in the front-to-back direction of mounting fasteners;

an enlarged front-to-back opening in the plate located generally centrally of the plate for facilitating electrical connection to the alarm generating components of the alarm;

indicia on the front side of the plate for indicating the correct orientation of the plate, as attached to a backbox, to provide a desired orientation of a feature of the alarm; and an alarm cover attached to the plate and covering at least a portion of the front surface thereof.

28. The assembly of claim 27, wherein the indicia indicate the correct orientation of the plate for each of a horizontal orientation of a feature of the alarm and a vertical orientation of the feature of the alarm.

29. The assembly of claim 28, wherein said feature of the alarm is a strobe lamp.

30. The assembly of claim 29, wherein the indicia comprise at least one of an arrow and words indicating the correct location of a particular side of the mounting plate to provide the desired orientation of the strobe lamp.

31. The assembly of claim 29, wherein:

the strobe lamp is carried by the alarm cover;

at least one mounting element is located on one side of the plate for engagement with at least one cooperating element on the alarm cover;

said at least one mounting element and said at least one cooperating element being positioned relative to said indicia and to said strobe lamp, respectively, such that the alarm cover can only be attached to the plate with the strobe lamp in the correct orientation indicated by said indicia.

32. The assembly of claim 31, further comprising:

at least one opening in the plate at a location spaced from said one side of the plate for receipt of a fastener for securing the alarm cover to the plate; and a corresponding opening in the alarm cover for the receipt therethrough of said cover fastener, said at least one opening in the plate and the corresponding opening in the alarm cover being in aligned relation for receipt of said cover fastener when said cooperating mounting elements on the plate and the alarm cover are in cooperative engagement.

33. The assembly of claim 32, wherein said at least one opening comprises the only opening on said plate for receipt of a fastener for securing the cover to the mounting plate.

34. The assembly of claim 31, further comprising a plurality of said mounting elements on said one side of the plate for engagement with a corresponding number of cooperating elements on the alarm cover.

35. The assembly of claim 34, wherein each mounting element on the plate comprises a projecting tab for insertion into a corresponding recess in the alarm cover.

36. The assembly of claim 27 wherein said plate is a one-piece, injection-molded plastic member.

37. The assembly of claim 27, wherein said plurality of openings are sized and located to permit the plate to be mounted to a plurality of different backboxes.

38. The assembly of claim 37, wherein said plurality of different backboxes include the single-gang backbox, the double-gang backbox, the four-inch backbox and the international backbox.

39. The assembly of claim 27, wherein said plurality of openings comprise five openings along each side of the plate, two of said openings being located adjacent the respective ends of each side and defining corner openings, one of said openings being located at substantially the midpoint of each side and defining a center opening, and one of said openings being located between each end opening and said center opening and defining an intermediate openings.

40. The assembly of claim 39, wherein:

said end openings along each plate side are sized and positioned to permit mounting of the plate to a four-inch backbox and to an international backbox;

said center opening along each plate side is sized and positioned to permit mounting of the plate to a single-gang backbox; and said intermediate openings along each plate side are sized and positioned to permit mounting of the plate to a double-gang backbox.

41. The assembly of claim 40, wherein each corner opening and each intermediate opening comprises at least in part an oval-shaped opening that is inclined at an angle to the adjacent side of the plate.

42. The assembly of claim 41, wherein each center opening comprises an oval-shaped opening that is substantially parallel to the adjacent side of the plate.

43. The mounting plate of claim 27, wherein:

said enlarged opening is surrounded on the front side of said plate by an upstanding base;

a strobe lamp is mounted in said upstanding base; and said indicia are arranged relative to said strobe lamp such that, when the plate is attached to a backbox in accordance with said indicia, the strobe lamp is oriented in the desired orientation.

44. The assembly of claim 43 wherein said plurality of openings along each plate side includes at least two openings, one located adjacent each end of each plate side.

45. The assembly plate of claim 44, wherein said plurality of openings along each plate side further includes two additional openings, one located intermediate to each end opening and the centerline of said plate side.

46. The assembly of claim 45, wherein:

said end openings along each plate side are sized and positioned to permit mounting of the plate to a four-inch backbox and to an international backbox; and said intermediate openings along each plate side are sized and positioned to permit mounting of the plate to a double-gang backbox.

47. The assembly of claim 43, further comprising means carried in part by said plate and in part by said alarm cover for removably attaching the alarm cover to the plate.

48. The assembly of claim 43, wherein said plate further comprises:

means for mounting a speaker to the back side thereof; and an opening in said plate generally overlying said speaker for sound transmission through the plate.

49. The assembly of claim 43, further comprising means carried at least in part by the plate and in part by the alarm cover for establishing a releasable snap-fit connection between the cover and the plate.

50. The assembly of claim 27, wherein the indicia comprise at least one of an arrow and words indicating the correct location of a particular side of the mounting plate to provide the desired orientation of the strobe lamp.

51. An audible-visual alarm and mounting plate assembly, comprising:

a generally square plate having a front side and a back side;

a plurality of front-to-back openings in the plate along each side of the plate for the receipt therethrough of mounting fasteners;

an enlarged front-to-back opening located generally centrally of the plate, said enlarged opening being surrounded on the front side of the plate by an upstanding base;

a strobe lamp mounted in said upstanding base;

an alarm cover for covering the front surface of the plate, said cover having a front-to-back opening therein for the receipt therethrough of said upstanding base; and means for releasably attaching the alarm cover to the plate with the upstanding base of the plate extending through the base opening in the plate in the back-to-front direction.

52. The assembly of claim 51, wherein said releasable attaching means comprises means carried in part by the plate and in part by the cover for establishing a snap-fit between the cover and the plate.

53. The assembly of claim 52, wherein said cover comprises a one-piece, molded plastic member.

* * * * *